United States Patent
Takami

(10) Patent No.: US 9,671,952 B2
(45) Date of Patent: Jun. 6, 2017

(54) FUNCTION EXECUTION PROGRAM, TERMINAL DEVICE, FUNCTION EXECUTION METHOD, RECORDING MEDIUM AND INFORMATION PROCESSING SYSTEM

(75) Inventor: Shinya Takami, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 540 days.

(21) Appl. No.: 13/503,219

(22) PCT Filed: Oct. 12, 2010

(86) PCT No.: PCT/JP2010/067880
§ 371 (c)(1),
(2), (4) Date: Apr. 20, 2012

(87) PCT Pub. No.: WO2011/048977
PCT Pub. Date: Apr. 28, 2011

(65) Prior Publication Data
US 2012/0212450 A1 Aug. 23, 2012

(30) Foreign Application Priority Data

Oct. 23, 2009 (JP) .................. 2009-243998

(51) Int. Cl.
G06F 3/0488 (2013.01)
G06F 3/01 (2006.01)

(52) U.S. Cl.
CPC .......... G06F 3/04883 (2013.01); G06F 3/017 (2013.01); G06F 3/0488 (2013.01)

(58) Field of Classification Search
CPC ..... G06F 3/0488; G06F 3/04883; G06F 3/017
(Continued)

(56) References Cited

U.S. PATENT DOCUMENTS 4,899,138 A 2/1990 Araki et al.
5,689,667 A * 11/1997 Kurtenbach .......... G06F 3/0482
715/810
(Continued)

FOREIGN PATENT DOCUMENTS

JP 63-172325 A 7/1988
JP 07-200126 A 8/1995
(Continued)

OTHER PUBLICATIONS

Japanese Office Action dated Jun. 18, 2013, issued in Japanese Patent Application No. 2009-243998.
(Continued)

Primary Examiner — Jonathan Horner
(74) Attorney, Agent, or Firm — Sughrue Mion, PLLC

(57) ABSTRACT

There are provided a function execution program, a terminal device, a function execution method, a recording medium and an information processing system capable of providing a more convenient touch panel operation method to a user. A computer is caused to function as a time measure means that detects a contact on an input means integral with a display means and measures contact duration at the contact point, a distance measure means that detects a continuous movement of the contact point and measures a moving distance, and an execution means that when the contact duration is a predetermined time or more and the moving distance is a predetermined distance or more, executes a preset function.

8 Claims, 9 Drawing Sheets

| DIRECTION | ANGLE RANGE | FIRST GROUP OF FUNCTIONS EQUAL TO OR MORE THAN 1 SECOND AND LESS THAN 5 SECONDS | SECOND GROUP OF FUNCTIONS EQUAL TO OR MORE THAN 5 SECONDS AND LESS THAN 10 SECONDS |
|---|---|---|---|
| UP | EQUAL TO OR MORE THAN 225° AND LESS THAN 315° | ADD TO FAVORITES | BOOKMARK |
| DOWN | EQUAL TO OR MORE THAN 45° AND LESS THAN 135° | ADD TO SHOPPING CART | SCREEN NOTE |
| LEFT | EQUAL TO OR MORE THAN 135° AND LESS THAN 225° | TOP PAGE OF STORE | SIMILARITY SEARCH |
| RIGHT | EQUAL TO OR MORE THAN −45° AND LESS THAN 45° | QUICK PURCHASE | RECOMMEND |
| UPPER LIMIT TIME | | 5 SECONDS | 10 SECONDS |

(58) Field of Classification Search
USPC .................. 345/173–179; 178/18.01–20.04
See application file for complete search history.

(56) References Cited

U.S. PATENT DOCUMENTS

| | | | |
|---|---|---|---|
| 7,302,650 B1* | 11/2007 | Allyn et al. .................. | 715/859 |
| 2002/0056575 A1* | 5/2002 | Keely et al. ................ | 178/18.01 |
| 2007/0288599 A1* | 12/2007 | Saul et al. .................... | 709/218 |
| 2008/0297492 A1* | 12/2008 | Shirakawa ............ | G06F 3/0486 |
| | | | 345/179 |
| 2008/0320419 A1* | 12/2008 | Matas .................... | G01C 21/20 |
| | | | 715/863 |

FOREIGN PATENT DOCUMENTS

| | | |
|---|---|---|
| JP | 11-507455 A | 6/1999 |
| JP | 11-305933 A | 11/1999 |
| JP | 2008-009668 A | 1/2008 |

OTHER PUBLICATIONS

Japanese Office Action issued Jan. 15, 2013 in corresponding Japanese Patent Application No. 2009-243998.

\* cited by examiner

FIG.4

| DIRECTION | ANGLE RANGE | FUNCTION |
|---|---|---|
| UP | EQUAL TO OR MORE THAN 225° AND LESS THAN 315° | ADD TO FAVORITES |
| DOWN | EQUAL TO OR MORE THAN 45° AND LESS THAN 135° | ADD TO SHOPPING CART |
| LEFT | EQUAL TO OR MORE THAN 135° AND LESS THAN 225° | TOP PAGE OF STORE |
| RIGHT | EQUAL TO OR MORE THAN −45° AND LESS THAN 45° | QUICK PURCHASE |

FIG.7

| DIRECTION | ANGLE RANGE | FIRST GROUP OF FUNCTIONS<br>EQUAL TO OR MORE THAN<br>1 SECOND<br>AND LESS THAN 5 SECONDS | SECOND GROUP OF FUNCTIONS<br>EQUAL TO OR MORE THAN<br>5 SECONDS<br>AND LESS THAN 10 SECONDS |
|---|---|---|---|
| UP | EQUAL TO OR MORE THAN 225°<br>AND LESS THAN 315° | ADD TO FAVORITES | BOOKMARK |
| DOWN | EQUAL TO OR MORE THAN 45°<br>AND LESS THAN 135° | ADD TO SHOPPING CART | SCREEN NOTE |
| LEFT | EQUAL TO OR MORE THAN 135°<br>AND LESS THAN 225° | TOP PAGE OF STORE | SIMILARITY SEARCH |
| RIGHT | EQUAL TO OR MORE THAN −45°<br>AND LESS THAN 45° | QUICK PURCHASE | RECOMMEND |
| | UPPER LIMIT TIME | 5 SECONDS | 10 SECONDS |

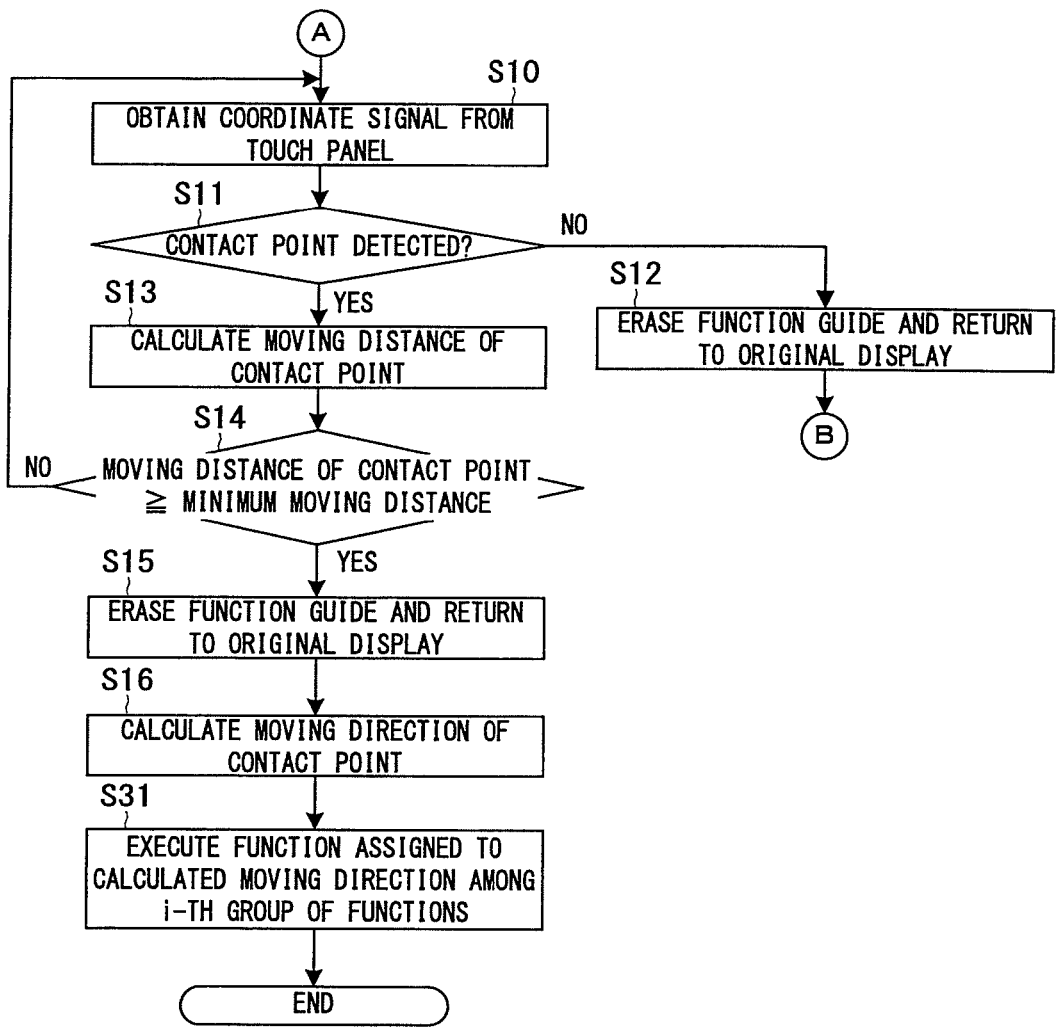

FUNCTION EXECUTION PROGRAM, TERMINAL DEVICE, FUNCTION EXECUTION METHOD, RECORDING MEDIUM AND INFORMATION PROCESSING SYSTEM

CROSS REFERENCE TO RELATED APPLICATIONS

This application is a National Stage of International Application No. PCT/JP2010/067880 filed Oct. 12, 2010, claiming priority based on Japanese Patent Application No. 2009-243998, filed Oct. 23, 2009, the contents of all of which are incorporated herein by reference in their entirety.

TECHNICAL FIELD

The present invention relates to a technical field of a terminal device comprising a touch panel, a function execution method in the terminal device, and the like.

BACKGROUND ART

There has been conventionally used a touch panel configured such that when a user contacts the touch panel, preset menu buttons are displayed in response to the contact point, and when the touch panel is temporarily de-touched (the user separates a finger or the like contacting the touch panel from it) and then the user contacts the menu button again, a predetermined function is executed.

However, there was a problem that since a display screen on a portable terminal is small and the menu buttons displayed on the first contact are correspondingly small, objects such as link information displayed around the menu buttons are erroneously selected when the touch panel is contacted again.

In the technique described in Patent Document 1, there is configured such that when a user contacts a touch panel, four regions assigned with predetermined functions in four directions about the contact point, respectively, are displayed, and when the touch panel is temporarily de-touched and the user contacts a region assigned with any function again, the predetermined function is executed.

PRIOR ART DOCUMENTS

Patent Document

Patent Document 1: Japanese Patent Application Laid-Open No. 2008-009668

SUMMARY OF THE INVENTION

Problems to be Solved by the Invention

However, there was a problem that since all the regions of the touch panel screen are assigned to each divided region with the predetermined function on the first touch, functions other than the predetermined functions cannot be selected until the assignment of the regions is cancelled.

There was a complicated problem that two actions are required, that is, the user contacts the touch panel and the touch panel is temporarily de-touched, and then the user contacts the touch panel again.

The present invention has been made in view of the above problems, and it is an object thereof to provide a function execution program, a terminal device, a function execution method, a recording medium and an information processing system capable of providing a more convenient touch panel operating method to a user.

Means for Solving the Problems

In order to achieve the above object, the invention according to claim 1 relates to a function execution program causing a computer to function as:

a time measure means that detects a contact point on an input means integral with a display means and measures contact duration at the contact point;

a distance measure means that detects a continuous movement of the contact point and measures a moving distance of the contact point; and an execution means that when the contact duration is a predetermined time or more and the moving distance is a predetermined distance or more, executes a preset function.

According to the present invention, when the user contacts the input means integral with the display means and keeps the contact on the contact point for more than the predetermined time and then continuously moves the contact point by more than the predetermined distance while keeping the contact, the preset function is executed and thus the objects originally displayed on the display means are not erroneously selected. Further, when the input means is temporarily de-touched, the objects originally displayed on the display means can be operated without the cancellation operation, and the user can execute the function through a series of operations including contact and movement, that is, one action, so that it is possible to provide a convenient method for operating the input means integral with the display means.

The invention according to claim 2 relates to the function execution program according to claim 1, the program further causing the computer to function as:

a direction detection means that detects a moving direction in which the contact point continuously moves, and the program causing the computer to function such that when the contact duration is a predetermined time or more and the moving distance is a predetermined distance or more, the execution means executes a function preset for a direction range including the detected moving direction.

According to the present invention, since the user determines a direction in which the contact point is to be moved thereby to select and execute a desired function from plural functions, it is possible to further enhance the convenience.

The invention according to claim 3 relates to the function execution program according to claim 1 or claim 2, the program causing the computer to function such that when the contact duration is a predetermined time or more and the moving distance is a predetermined distance or more, the execution means executes a function preset for a time range including the contact duration.

According to the present invention, since the user determines the contact duration at the contact point thereby to select and execute a desired function from plural functions, it is possible to further enhance the convenience.

The invention according to claim 4 relates to a terminal device comprising:

a time measure means that detects a contact point on an input means integral with a display means and measures contact duration at the contact point;

a distance measure means that detects a continuous movement of the contact point and measures a moving distance of the contact point; and an execution means that when the contact duration is a predetermined time or more and the moving distance is a predetermined distance or more, executes a preset function.

The invention according to claim 5 relates to the terminal device according to claim 4, further comprising:

a direction detection means that detects a moving direction in which the contact point continuously moves, wherein when the contact duration is a predetermined time or more and the moving distance is a predetermined distance or more, the execution means executes a function preset for a direction range including the detected moving direction.

The invention according to claim 6 relates to the terminal device according to claim 4 or claim 5, wherein when the contact duration is a predetermined time or more and the moving distance is a predetermined distance or more, the execution means executes a function preset for a time range including the contact duration.

The invention according to claim 7 relates to a function execution method comprising:

a time measure step of detecting a contact point on an input means integral with a display means and measuring contact duration at the contact point;

a distance measure step of detecting a continuous movement of the contact point and measuring the moving distance of the contact point; and an execution step of, when the contact duration is a predetermined time or more and the moving distance is a predetermined distance or more, executing a preset function.

The invention according to claim 8 relates to a recording medium computer-readably recording a function execution program therein, the program causing a computer to function as:

a time measure means that detects a contact point on an input means integral with a display means and measures contact duration at the contact point;

a distance measure means that detects a continuous movement of the contact point and measures a moving distance of the contact point; and an execution means that when the contact duration is a predetermined time or more and the moving distance is a predetermined distance or more, executes a preset function.

The invention according to claim 9 relates to an information processing system comprising a terminal device and a server device to which the terminal device can be connected via a network, wherein the terminal device comprises:

a time measure means that detects a contact point on an input means integral with a display means and measures contact duration at the contact point;

a distance measure means that detects a continuous movement of the contact point and measures a moving distance of the contact point; and a transmission means that when the contact duration is a predetermined time or more and the moving distance is a predetermined distance or more, transmits an execution request for a preset function to the server device, and the server device comprises:

a receiving means that receives the execution request transmitted from the terminal device; and a processing means that executes a processing corresponding to the received execution request.

According to the present invention, even a function not executable by only the terminal device can be realized in cooperation with the server device.

The invention according to claim 10 relates to a function execution program causing a computer to function as:

a time measure means that detects a contact point on a touch panel and measures contact duration at the contact point;

a distance measure means that detects a continuous movement of the contact point and measures a moving distance of the contact point; and an execution means that when the contact duration is a predetermined time or more and the moving distance is a predetermined distance or more, executes a preset function.

According to the present invention, when the user contacts the touch panel and keeps the contact on the contact point for more than the predetermined time, and then continuously moves the contact point by more than the predetermined distance while keeping the contact, the preset function is executed and the objects originally displayed on the touch panel are not erroneously selected. Further, when the touch panel is temporarily de-touched, the objects originally displayed on the touch panel can be operated without the cancellation operation, and the user can execute the function through a series of operations including contact and movement, that is, one action, so that it is possible to provide a convenient touch panel operating method.

Effect of the Invention

According to the present invention, when the user contacts the input means integral with the display means and keeps the contact on the contact point for more than the predetermined time and then continuously moves the contact point by more than the predetermined distance while keeping the contact, the preset function is executed and thus the objects originally displayed on the display means are not erroneously selected. Further, when the input means is temporarily de-touched, the objects originally displayed on the display means can be operated without the cancellation operation, and the user can execute the function through a series of operations including contact and movement, that is, one action, so that it is possible to provide a more convenient method for operating the input means integral with the display means.

BRIEF DESCRIPTION OF THE DRAWINGS

FIG. 4 is a diagram showing an example of contents set in a function table according to one embodiment.

FIG. 7 is a diagram showing an example of contents set in the function table according to one embodiment.

FIG. 9 is a flowchart showing a processing example of the control unit 101 in the cell phone 100 according to one embodiment.

MODES FOR CARRYING OUT THE INVENTION

Hereinafter, embodiments according to the present invention will be described below in detail with reference to the drawings. The embodiments described later are when the present invention is applied to a shopping system by which products are sold and bought by exchange of electronic information over a network.

1. First Embodiment

1.1 Outline of Structure and Function of Shopping System

First, a structure and schematic function of a shopping system S according to the present embodiment will be described with reference to FIG. 1 and FIG. 2.

Figure 1:
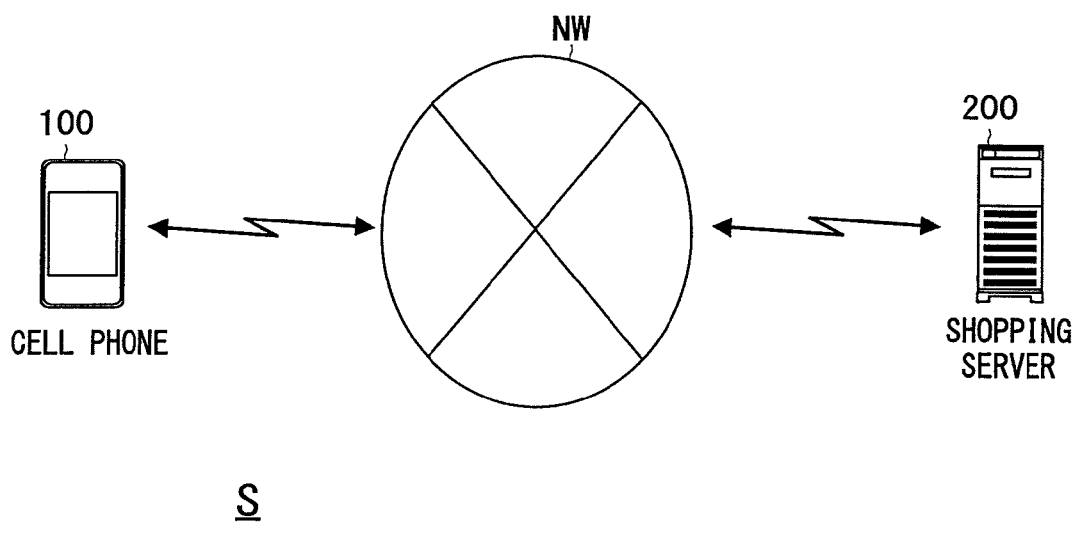
FIG. 1 is a diagram showing an example of the schematic structure of a shopping system S according to one embodiment.

FIG. 1 is a diagram showing an example of the schematic structure of the shopping system S according to the present embodiment.

As shown in FIG. 1, the shopping system S includes a cell phone 100 as an example of a terminal device, and a shopping server 200 as an example of a server device. The shopping server 200 and the cell phone 100 can mutually send and receive data by use of such as TCP/IP or the like as communication protocol via a network NW. Incidentally, the network NW is constructed of, for example, Internet, a dedicated communication line (such as CATV (Community Antenna Television) line), a mobile communication network (including base stations and the like), a gateway, and the like.

In the thus-configured shopping system S, the cell phone 100 comprises a touch panel. Further, a user operates the touch panel so that the cell phone 100 executes various functions. Then, the user operates the touch panel so that the cell phone 100 receives and displays a Web page from the shopping server 200. The cell phone 100 exchanges data with the shopping server 200 so that the user of the cell phone 100 can purchase products on the shopping site.

The shopping server 200 transmits a Web page to the cell phone 100 in response to a request from the cell phone 100, and performs the processing such as user's product purchase.

1.2 Structure and Function of User Terminal

A structure and function of the cell phone 100 will be described below with reference to FIGS. 2 to 4.

Figure 2:
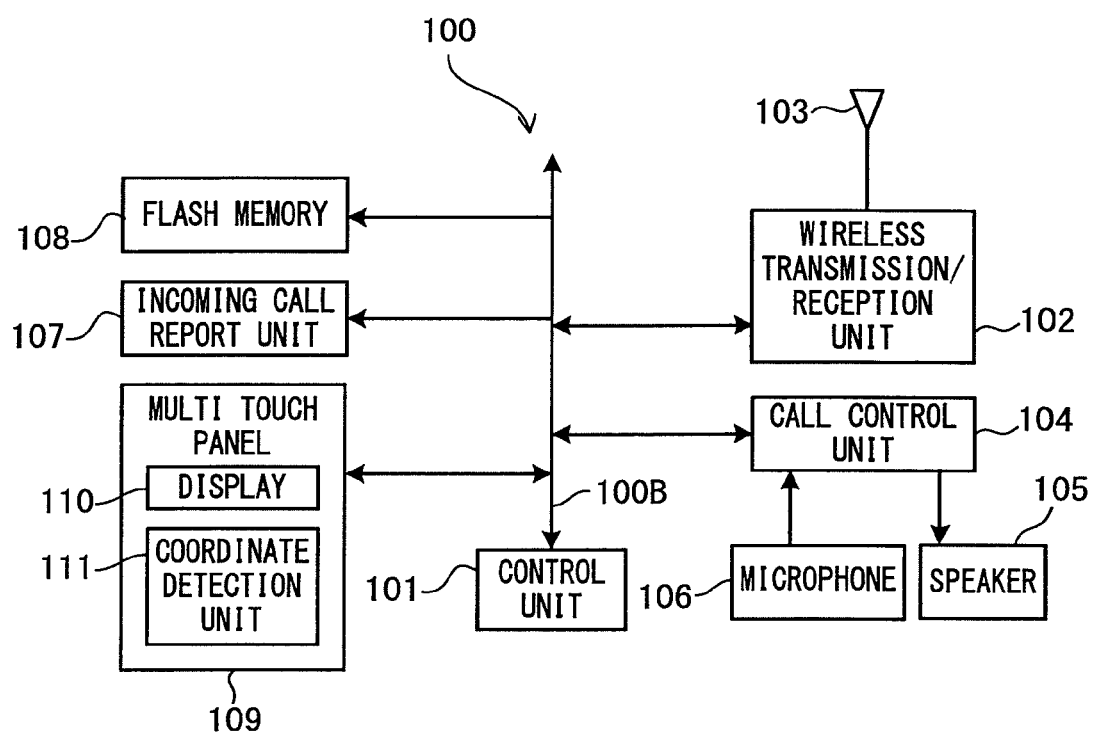
FIG. 2 is a block diagram showing an example of the schematic structure of a cell phone 100 according to one embodiment.

FIG. 2 is a block diagram showing an example of the schematic structure of the cell phone 100 according to the present embodiment. FIG. 3 is a diagram showing an example of displays of the screen for the hold and slide operation. FIG. 4 is a diagram showing an example of contents set in a function table.

As shown in FIG. 2, the cell phone 100 according to the present embodiment has a control unit 101, a wireless transmission/reception unit 102, an antenna 103, a call control unit 104, a speaker 105, a microphone 106, an incoming call report unit 107, a flash memory 108, and a multi touch panel 109 as an example of a touch panel. The control unit 101, the wireless transmission/reception unit 102, the call control unit 104, the incoming call report unit 107, the flash memory 108 and the multi touch panel 109 are mutually connected via a bus 100B, and data and signals are sent and received therebetween.

The wireless transmission/reception unit 102 accesses a mobile communication network via the antenna 103, and exchanges various items of data such as voice data, message data and image data with other device comprising a communication means.

The wireless transmission/reception unit 102 accesses the shopping server 200 via the mobile communication network to establish a link and uses a protocol such as HTTP (HyperText Transfer Protocol) to send and receive various items of data while a Web browsing application software (which will be called "browsing application" below) described later is being activated.

The multi touch panel 109 (an example of an input means integral with a display means) serves as a display of the cell phone 100 and as an input device. In order to serve the functions, the multi touch panel 109 has a display 110, and a coordinate detection unit 111 for detecting a coordinate of a point (which will be called "contact point" below) touched by the user with his/her finger or stylus pen (which will be called "finger or the like" below). The display 110 displays various screens under control of the control unit 101. The coordinate detection unit 111 transmits a coordinate signal indicative of a user-touched coordinate on various screens to the control unit 101. The control unit 101 then detects a user input operation based on the received coordinate signal. Incidentally, the coordinate detection unit 111 may be configured as part of the display 110.

Herein, basic terms relating to the input operation to the multi touch panel 109 will be described. In the present embodiment, "touch" means that a finger or the like contacts the screen of the display 110. "De-touch" means that a finger or the like previously contacting the screen of the display 110 is separated from the screen. "Tap" means that the user touches the screen of the display 110 and then rapidly de-touches the same. The tap operation is used as an operation of selecting an object (such as button or link displayed on the screen, and selectable by the user) displayed on the screen, for example. "Slide" means that a finger or the like contacting the screen of the display 110 is moved (slid) without being separated from the screen. The slide operation is used as an operation of scrolling the screen, for example.

The multi touch panel 109 employs the optical coordinate detection unit 111 capable of detecting multiple points (detecting the touches on the points (coordinates) at the same time). An optical sensor is incorporated in each pixel of the panel configuring the display 110 and the optical coordinate detection unit 111 using the optical sensor system detects, by the optical sensors, a coordinate at which a finger or the like approaches or contacts the display 110. In this way, since a finger or the like only approaches the multi touch panel 109, not contacting the same, so that the optical coordinate detection unit 111 can detect the coordinate, there will be also described, as the touch operation, an operation of approaching a finger or the like to the multi touch panel 109 within a range where the coordinate detection unit 111 can detect coordinates. Incidentally, the coordinate detection unit 111 will be described as the optical coordinate detection unit 111 using the optical sensor system in the present embodiment, but there can be employed a coordinate detection unit using a well-known optical system or other system capable of detecting multiple points. The coordinate detection unit can further employ a coordinate detection unit using a well-known system such as projective capacitive system or resistive system capable of detecting multiple points, not limited to an optical one.

The control unit 101 is configured a CPU as a core and comprises memories such as ROM and RAM, and the CPU reads various control programs stored in the ROM or the flash memory 108, and executes control programs to conduct various controls of the cell phone 100 while using the RAM as needed. Particularly, the control unit 101 executes a browsing application and thus functions as a time measure means, a distance measure means, a direction detection means, an execution means and a transmission means of the present invention. The browsing application may be previously stored in the ROM or flash memory 108, may be read in the flash memory 108 via a recording medium such as memory card, or may be downloaded from a predetermined server device via the network NW.

The browsing application is application software providing the Web browser function of receiving HTML documents or other data from the Web server in response to an input operation in the multi touch panel 109, and of displaying the Web page on the screen. Particularly, the browsing application provides various functions by which the cell phone 100 cooperates with the shopping server 200 and enables to conveniently and easily use shopping sites.

Further, the browsing application provides a simple operation method by which the cell phone 100 executes various functions. The operation method is that the user touches the screen and keeps a touched finger or the like for more than a predetermined time (such as one second) without moving the touched finger or the like, and then the user slides (moves) the touched finger or the like in a predetermined direction by more than a predetermined distance (such as 1 cm). The operation is called "hold and slide operation." The hold and slide operation will be described below more specifically.

At first, when the browsing application is activated, a group of buttons corresponding to various functions is displayed on the screen and a page display region is displayed on the screen. The page display region is where a Web page is displayed.

In FIG. 3, numeral 300 denotes a page display region. In FIG. 3A, a Web page indicating details of a product searched by the user is displayed in the page display region, for example. The user touches an arbitrary position in the page display region. In FIG. 3A, numeral 301 denotes a finger of a user's hand.

Figure 3A:
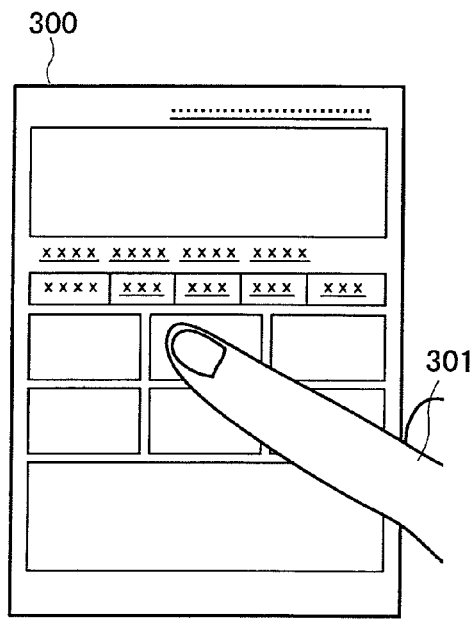
FIG. 3A to 3D are diagrams showing examples of display of screens for a hold and slide operation according to one embodiment.
Figure 3B:
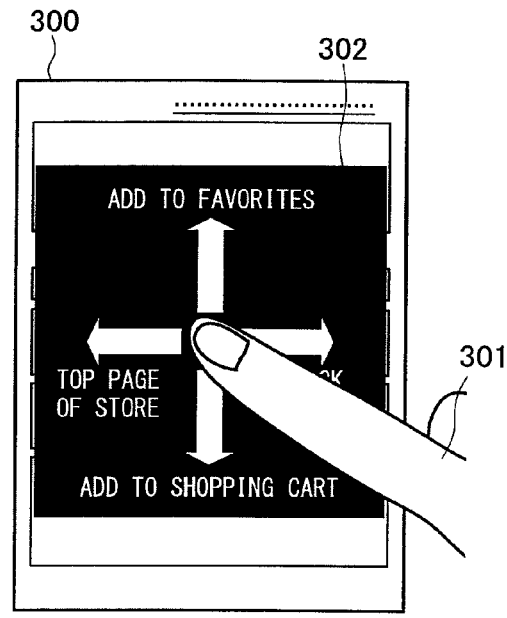

When a predetermined time elapses while the user keeps the touch of the finger or the like, a function guide (numeral 302) is displayed on the displayed Web page in an overlapped manner as shown in FIG. 3B. The function guide is information indicative of a correspondence between a slide direction of the finger or the like and a function to be executed. Specifically, as the function guide, the up, down, left and right arrows are displayed and the functions to be executed are displayed for the arrows, respectively. For example, the up direction, the down direction, the left direction and the right direction are assigned to "add to favorites", "add to shopping cart", "top page of store" and "quick purchase", respectively. "Add to favorites" is a function of registering a product whose details are displayed in favorites. "Add to shopping cart" is a function of putting a product whose details are displayed in a shopping cart. "Top page of store" is a function of moving to the top Web page of a store selling a product whose details are displayed. "Quick purchase" is a function of moving to a Web page for purchasing a product whose details are displayed.

Figure 3C:
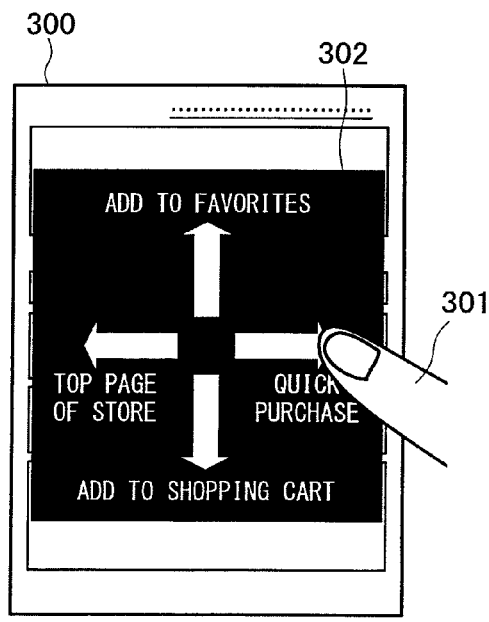
Figure 3D:
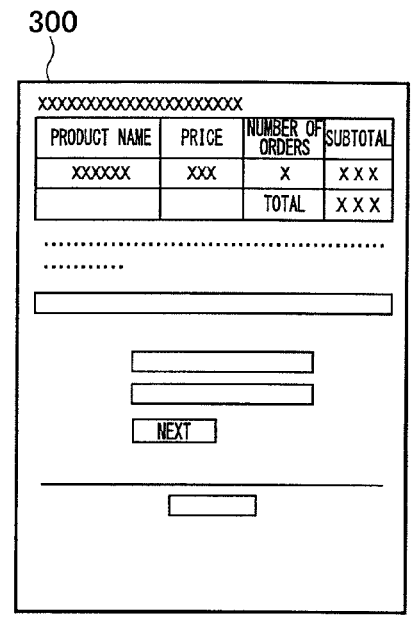

After the function guide is displayed, the user slides the touched finger or the like in a direction, for example in the right direction by more than a predetermined distance as shown in FIG. 3C. As shown in FIG. 3D, the function guide is erased from the screen and the function corresponding to the slide direction is executed. Since the right direction is for "quick purchase", a Web page for purchasing a product is displayed in the page display region. When the user de-touches before sliding the finger or the like by more than the predetermined distance, the function guide is erased from the screen and the originally-displayed Web page is displayed in the page display region. Therefore, the user can select an object on the Web page without any cancellation operation.

A time until the function guide is displayed after the user touches the page display region is called "minimum contact time." A distance by which a finger or the like needs to be slid for executing the function after the function guide is displayed is called "function execution distance." The minimum contact time and the function execution distance are previously set and are stored in the flash memory 108, for example. The minimum contact time is a time for discriminating the typical tap operation and the slide operation from the hold and slide operation, for example. That is, the operation that the user touches the page display region and then de-touches the same before the minimum contact time elapses becomes the tap operation. Further, the operation that the user touches the page display region and then slides a finger or the like before the minimum contact time elapses becomes the slide operation. Thus, the minimum contact time is set at a proper value in order to discriminate the operations and the hold and slide operation. The function execution distance is a distance for discriminating between a user's erroneous operation or user's unintentional contact on the multi touch panel 109 and a slide of the hold and slide operation, for example. The settings of the minimum contact time and the function execution distance may be changed by a user operation.

The assignment of the function to the slide direction is defined by the function table shown in FIG. 4, for example. The function table is stored in the flash memory 108, for example. In the function table, an angle range and identification information indicative of a function of a direction in correspondence to each up, down, left or right slide direction.

An angle indicated in the angle range is assumed as 0° in the right direction relative to the user-touched point, that is, the contact point, and 90°, 180°, and 270° in the down direction, in the left direction and in the right direction in a clockwise manner from the right direction. The up, down, left and right directions each have an angle range of 90°. For example, the up direction has the angle range of equal to or more than 225° and less than 315°. That is, the up direction includes a deviation of less than 45° in the right and left directions relative to the top, not only the top (the direction of 270°).

The functions assigned to the slide directions are limited to the four functions described above. Other functions include "bookmark", "screen note", "similarity search", "recommend", "in-page jump" and the like, for example. "Bookmark" is a function of registering a displayed Web page to bookmarks. "Screen note" is a function of storing HTML documents and image data configuring a displayed Web page in the flash memory 108. "Similarity search" is a function of searching a product similar to the product whose details are displayed. "Recommend" is a function of recommending purchasing another product based on the product whose details are displayed. "In-page jump" is a function of, when part of a Web page is displayed in the page display region, moving to a next jump tag of the Web page. The jump tag is an anchor tag or the like described in a HTML document configuring the Web page, and is given a label (name attribute) for identifying a jump destination. The assignment of the functions to the slide directions may be changed in setting by the user operation.

"Bookmark", "screen note" and "in-page jump" among the functions can be realized by only the cell phone 100. On the other hand, the cell phone 100 needs to cooperate with the shopping server 200 for realizing other functions. For that purpose, when displaying a Web page on the screen, the control unit 101 obtains a product ID as product identification information, a store ID as store identification information or the like from the HTML document configuring the Web page or its URL. When the hold and slide operation is performed, the control unit 101 selects a function corresponding to the slide direction based on the function table. When selecting a function needing to cooperate with the shopping server 200, the control unit 101 transmits a HTTP request (example of an execution request) corresponding to the selected function to the shopping server 200, for example. For example, when "add to favorites", "add to shopping cart", "quick purchase", "similarity search" or "recommend" is selected, the control unit 101 adds a product ID of a product whose details are displayed to the URL corresponding to the function thereby to create a request URL, and transmits a request including the request URL to the shopping server 200. When "top page of store" is selected, the control unit 101 creates a URL of the top Web page of the store based on the store ID of the store selling the product whose details are displayed, and transmits a request including the request URL to the shopping server 200.

1.3 Structure and Function of Shopping Server

A structure and function of the shopping server 200 will be described below with reference to FIG. 5.

Figure 5:
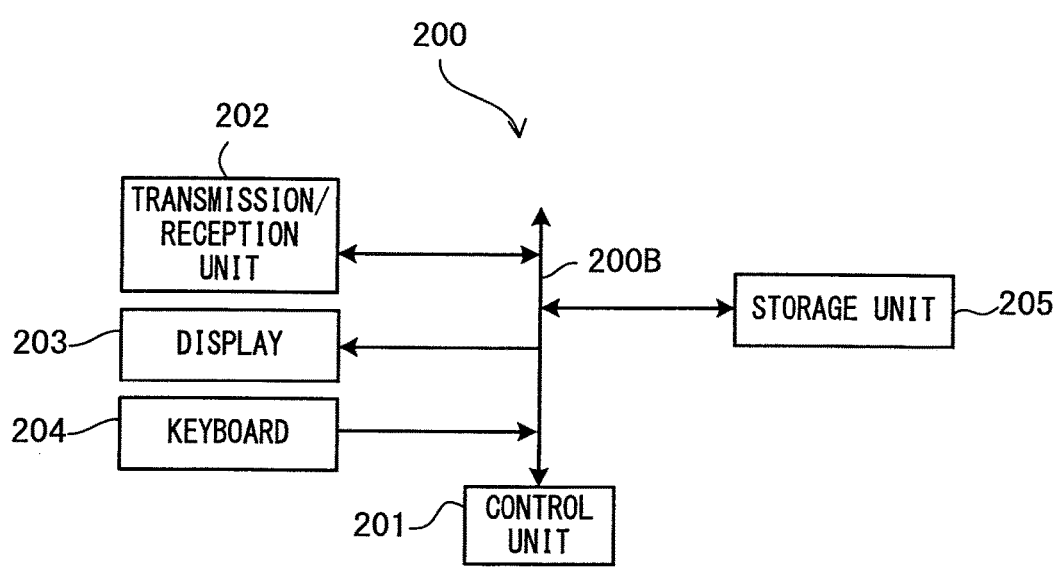
FIG. 5 is a block diagram showing an example of the schematic structure of a shopping server 200 according to one embodiment.

FIG. 5 is a block diagram showing an example of the schematic structure of the shopping server 200 according to the present embodiment.

As shown in FIG. 5, the shopping server 200 according to the present embodiment has a control unit 201, a transmission/reception unit 202, a display 203, a keyboard 204 and a storage unit 205. The components are mutually connected via a bus 200B, and data and signals are sent and received therebetween.

The transmission/reception unit 202 establishes a link with the cell phone 100 and sends and receives various items of data therewith.

The display 203 and the keyboard 204 are used by a manager of the shopping server 200 for maintaining and managing the shopping server 200.

The storage unit 205 is configured of a hard disc drive and the like, for example. In the storage unit 205, various databases such as member DB (database), store DB, product DB and member use DB are constructed. In the member DB, information on users registered as the members on the shopping site (member identification information such as member ID, password, name, address, phone number and e-mail address) is registered per user. In the store DB, information on stores selling products on the shopping site (such as store ID, password, store name, address, phone number and e-mail address) is registered per store. In the product DB, information on products sold on the shopping site (such as store ID of store selling products, product ID, product name, price, explanation, product images) is registered per store and product. In the member use DB, information on users for use of the shopping site (information such as member ID, purchase history, browse history, favorites) is registered per user.

Further, in the storage unit 205, various items of data such as HTML documents, image data, voice data, text data and electronic documents of each Web page configuring the shopping site is stored.

The control unit 201 is configured a CPU as a core and comprises memories such as ROM and RAM, the CPU reads various control programs stored in the ROM or the storage unit 205, and executes control programs to conduct various controls of the shopping server 200 while using the RAM as needed. Particularly, the control unit 201 executes a Web server program to function as the receiving means and the processing means of the present invention. The Web server program may be read in the storage unit 205 via a recoding medium such as CD-ROM, or may be downloaded from a predetermined server device via the network NW.

1.4 Operations of Shopping System

The operations of the shopping system S will be described below with reference to FIG. 6.

Figure 6:
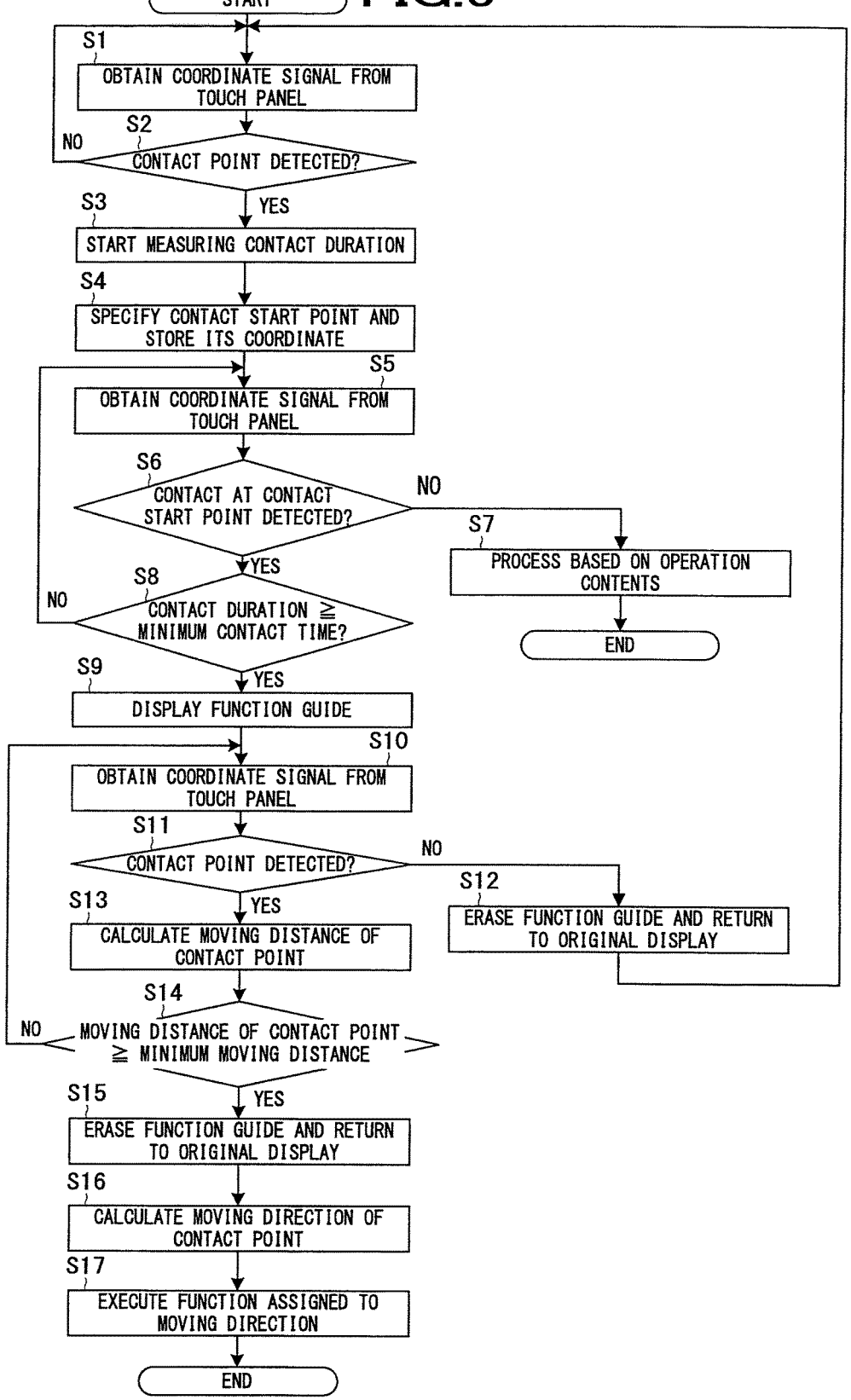
FIG. 6 is a flowchart showing a processing example of a control unit 101 in the cell phone 100 according to one embodiment.

FIG. 6 is a flowchart showing a processing example of the control unit 101 in the cell phone 100 according to the present embodiment.

The browser application is activated in the cell phone 100. The browser application is activated thereby to log in a shopping site. The shopping server 200 issues a session ID to the cell phone 100 in response to the log-in. Since the session ID is included in a request from the cell phone 100 to the shopping server 200, the shopping server 200 can specify from which user the request has come.

The cell phone 100 transmits a request to the shopping server 200 based on a user operation, and the shopping server 200 performs a product search processing based on the request and transmits a HTML document indicating the details of a user-selected product to the cell phone 100. The control unit 101 in the cell phone 100 displays a Web page in the page display region on the screen based on the received HTML document. The processing shown in FIG. 6 starts when the processing of displaying the Web page is completed.

At first, the control unit 101 obtains a coordinate signal from the coordinate detection unit 111 in the multi touch panel 109 (step S1). Next, the control unit 101 determines whether a contact point in the page display region on the screen has been detected based on the obtained coordinate signal (step S2). That is, the control unit 101 determines whether the page display region has been touched. At this time, when a contact point has not been detected (step S2: NO), the control unit 101 proceeds to step S1 to obtain a coordinate signal at a next sampling timing.

On the other hand, when a contact point has been detected (step S2: YES), the control unit 101 starts to measure contact duration as the time measure means (step S3). Next, the control unit 101 specifies a contact start point and stores the coordinate of the specified contact start point in the RAM (step S4). When a finger or the like touches the screen, generally, the contact points (a group of contact points) are detected as a group of coordinates of the contact points corresponding to the contact region having an area in which the finger or the like touches. In this case, the control unit 101 specifies a center coordinate of the contact region as the coordinate of the contact start point. For example, it is assumed that an intermediate point between the coordinate of the left end of the contact region and the coordinate of the right end thereof is an X coordinate and an intermediate point between the coordinate of the upper end of the contact region and the coordinate of the lower end thereof is a Y coordinate. When only one contact point is detected, the coordinate of the one point is assumed as the contact start point.

When a next sampling timing comes after the control unit 101 stores the coordinate of the contact start point, the control unit 101 obtains a coordinate signal from the coordinate detection unit 111 of the multi touch panel 109 (step S5). Next, the control unit 101 determines whether the contact has been detected at the contact start point based on the obtained coordinate signal (step S6). At this time, when the contact has not been detected at the contact start point (step S6: NO), the control unit 101 proceeds to step S7. That the contact has not been detected at the contact start point means that the de-touch (in this case, the tap) has been performed or the touched finger or the like has slid and thereby the contact point has moved. Thereby, the control unit 101 performs a processing corresponding to the tap operation or slide operation in step S7.

On the other hand, when the contact has been detected at the contact start point (step S6), the control unit 101 proceeds to step S8. That the contact has been detected at the contact start point means that the de-touch has not been performed and the touched finger or the like has not slid (the contact point has not moved or has seldom moved). Thus, in step S8, the control unit 101 determines whether an elapsed time since the contact has been detected (the measurement of the contact duration has been started in step S3), that is the contact duration is the minimum contact time or more (step S8). At this time, when the contact duration is less than the minimum contact time (step S8: NO), the control unit 101 proceeds to step S5 to obtain a coordinate signal at a next sampling timing.

On the other hand, when the contact duration is the minimum contact time or more (step S8: YES), the control unit 101 displays the function guide in the page display region (step S9). Then, the control unit 101 detects a continuous movement of the contact point and measures a moving distance of the contact point in steps S10 to S14 as the distance measure means. The detection of a continuous movement of the contact point is to detect a slide in the hold and slide operation. Then, the continuous movement of the contact point for the control unit 101 is that the contact point moves as a condition under which the contact point is detected at every sampling timing. Further, if a contact at a current sampling timing is detected at least at one point among the contact points (group of contact points) detected at the previous sampling timing, the contact may be assumed as the condition for determining the continuous movement of the contact point. If the user slides the touched finger or the like, the contact point cannot be detected at completely separated positions between the previous sampling timing and the current sampling timing, and at least some contact points overlap on each other. Even when the movement of the contact point restarts after the movement of the contact point temporarily stops, the movement is considered as the continuous movement of the contact point.

At first, when a next sampling timing comes, the control unit 101 obtains a coordinate signal from the coordinate detection unit 111 in the multi touch panel 109 (step S10). Next, the control unit 101 determines whether a contact point has been detected based on the obtained coordinate signal (step S11). At this time, when a contact has not been detected (step S11: NO), the control unit 101 proceeds to step S12. That the contact has not been detected is that the touched finger or the like has de-touched until it has moved by more than the function execution distance or the like. Therefore, the control unit 101 erases the function guide from the screen and returns to the original screen display in step S12. Then, the control unit 101 proceeds to step S1 to obtain a coordinate signal at a next sampling timing.

On the other hand, when a contact point has been detected (step S11: YES), the control unit 101 now specifies a center coordinate of the contact region as a current contact point and measures a moving distance of the contact point from the contact start point to the current contact point (step S13). Incidentally, the linear distance between the contact start point and the current contact point may be assumed as the moving distance of the contact point. Next, the control unit 101 determines whether the calculated moving distance of the contact point is the function execution distance or more (step S14). At this time, when the moving distance of the contact point is less than the function execution distance (step S14: NO), the control unit 101 proceeds to step S10 to obtain a coordinate signal at a next sampling timing.

On the other hand, when the moving distance of the contact point is the function execution distance or more (step S14: YES), the control unit 101 erases the function guide from the screen and returns to the original screen display. Next, the control unit 11 calculates a moving direction of the contact point based on the coordinate of the contact start point and the coordinate of the current contact point as the direction detection means (step S16). Next, the control unit 101 refers to the function table to select and execute a function assigned to an angle range including the calculated moving direction, as the execution means (step S17). At this time, when the function to be executed is a function to cooperate with the shopping server 200, the control unit 101 transmits a request corresponding to the function to the shopping server 200 as the transmission means. When the control unit 201 in the shopping server 200 receives the request from the cell phone 100 as the receiving means, the control unit 201 executes a processing corresponding to the selected function while accessing various databases based on the request as the processing means. Then, the control unit 201 transmits a response to the cell phone 100 based on the execution result of the processing. At this time, the control unit 201 transmits the response including the HTML document indicating the execution result and the like as needed. The control unit 101 in the cell phone 100 displays the function execution result on the screen or displays the Web page on the screen based on the received response.

As described above, according to the present embodiment, the control unit 101 in the cell phone 100 detects a contact point on the multi touch panel 109, measures the contact duration at the contact point, detects a continuous movement of the contact point, measures a moving distance of the contact point, and when the contact duration is the minimum contact time or more and the moving distance of the contact point is the function execution distance or more, performs a preset function. Thus, the user performs the hold and slide operation that after the user touches the multi touch panel 109 and keeps the contact at the contact point for more than the minimum contact time, the user continuously moves the contact point by more than the function execution distance while keeping the contact, so that the preset function is executed, and thus the objects originally displayed on the multi touch panel cannot be erroneously selected. The multi touch panel 109 is temporarily de-touched without the cancellation operation, so that the objects originally displayed on the touch panel 109 can be operated, and since the user can execute the functions via a series of operations including contact and movement, that is, one action, it is possible to enhance the convenience.

Further, the control unit 101 in the cell phone 100 detects a moving direction in which the contact point has continuously moved, and when the contact duration is the minimum contact time or more and the moving distance of the contact point is the function execution distance or more, executes a preset function in the angle range including the detected moving direction. Thus, since the user determines the direction in which the contact point is to move thereby to select and execute a desired function from among the functions, it is possible to further enhance the convenience.

Furthermore, when the contact duration is the minimum contact time or more and the moving distance of the contact point is the function execution distance or more, the control unit 101 in the cell phone 100 transmits a request for executing a preset function to the shopping server 200 and the control unit 201 in the shopping server 200 receiving the request executes a processing corresponding to the request. Therefore, even a function not executable by only the cell phone 100 can be realized in cooperation with the shopping server 200.

Furthermore, when the contact duration is the minimum contact time or more, the control unit 101 in the cell phone 100 displays the function guide on the screen, and when a contact point is not detected, the control unit 101 erases the function guide from the screen and returns the screen display to the original state before the function guide has been displayed. Thus, the objects originally displayed on the multi touch panel 109 can be operated without the cancellation operation while the user can recognize in which direction to slide a finger or the like.

2. Second Embodiment

A second embodiment will be described below. The second embodiment will be described only for different points from the first embodiment, and a detailed explanation of the same points as the first embodiment will be omitted.

In the first embodiment, the functions are assigned to the slide directions, respectively, in the hold and slide operation. To the contrary, in the second embodiment described later, the functions are assigned to the slide directions and the contact duration.

FIG. 7 is a diagram showing an example of contents set in a function table. In the function table according to the present embodiment, groups of functions are assigned to the ranges of the contact duration, respectively. For example, when the minimum contact time is 1 second, the first group of functions is assigned to the period of equal to or more than 1 second and less than 5 seconds, and the second group of functions is assigned to the period of equal to or more than 5 seconds and less than 10 seconds. Then, the functions are assigned to the up, down, left and right slide directions in the first group of functions and the second group of functions, respectively. That is, eight functions are assigned in total in the first group of functions and the second group of functions. Further, in the function table, the upper limit time of the group of functions is set per group of functions. The upper limit of the time range corresponding to the group of functions is set as the upper limit time of the group of functions (for example, the upper limit time of the first group of functions is set to 5 seconds and the upper limit time of the second group of functions is set to 10 seconds).

The hold and slide operation according to the present embodiment will be described more specifically. When the user touches the page display region on the screen and one second of the minimum contact time elapses while the touched finger keeps fixed, the function guide 1 corresponding to the first group of functions is displayed. Specifically, the respective functions included in the first group of functions are displayed in correspondence to the respective up, down, left and right slide directions as the function guide 1. Thereafter, before 5 seconds of the upper limit time of the first group of functions elapses since the user has started touching the touch panel, the user slides the touched finger by more than the function execution distance in a direction, so that a function corresponding to the slide direction among the first group of functions is executed. How the screen transits at this time is the same as that in FIGS. 3A to 3D. On the other hand, when 5 seconds elapses since the user has started touching the touch panel while the user keeps the touched finger fixed, the function guide 2 corresponding to the second group of functions is displayed in place of the function guide 1. Specifically, the respective functions included in the second group of functions are displayed in correspondence to the respective up, down, left and right slide directions as the function guide 2. Thereafter, before 10 seconds of the upper limit time of the second group of functions elapses since the user has started touching the touch panel, the user slides the touched finger by more than the function execution distance in a direction, so that the function corresponding to the slide direction is executed among the second group of functions. On the other hand, when 10 seconds elapses since the user has started touching the touch panel while the user keeps the touched finger fixed, the function guide 2 is erased from the screen and is returned to the original screen display.

The operations of the shopping system S will be described below with reference to FIG. 8 and FIG. 9.

Figure 8:
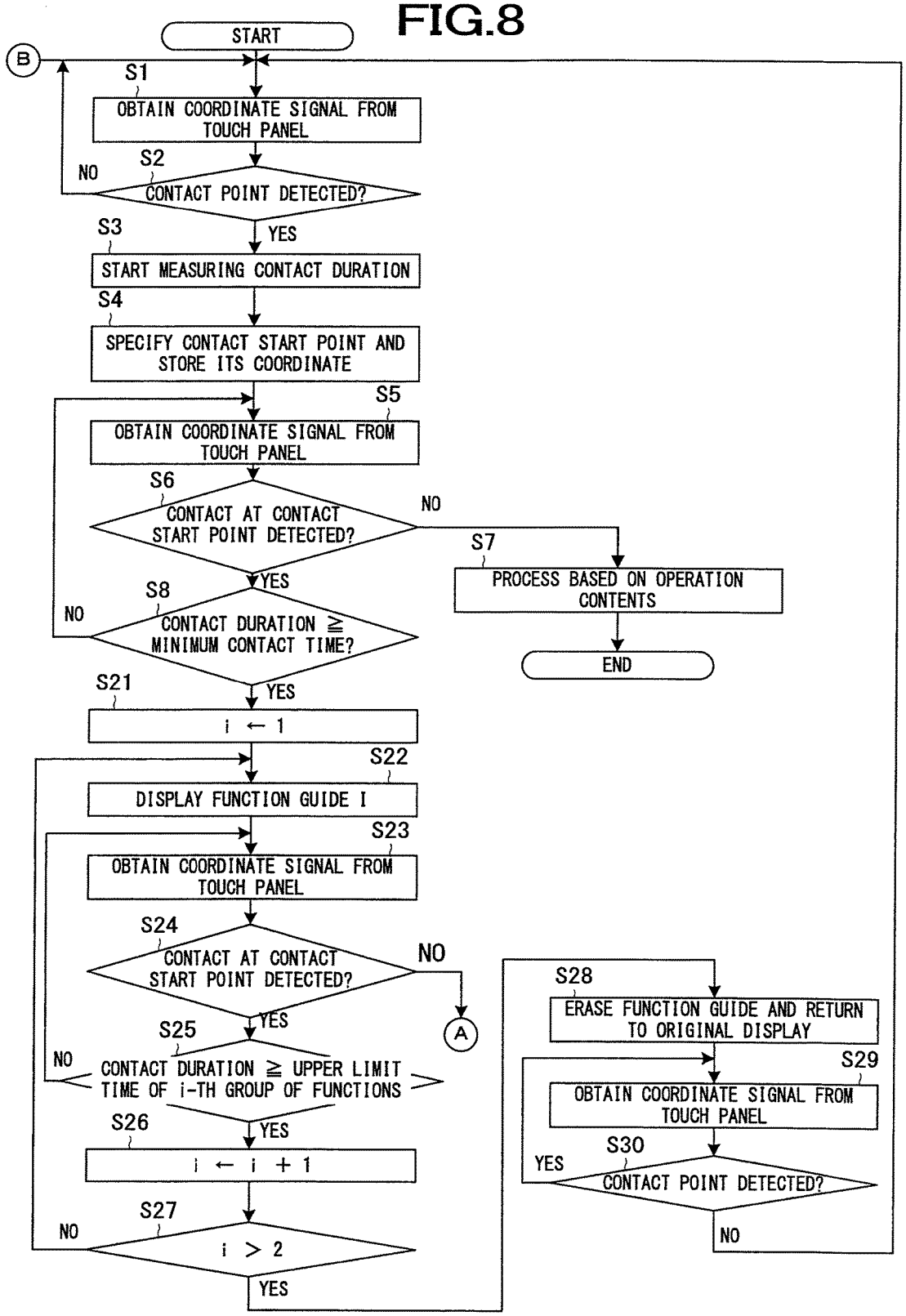
FIG. 8 is a flowchart showing a processing example of the control unit 101 in the cell phone 100 according to one embodiment.

FIG. 8 and FIG. 9 are flowcharts showing processing examples of the control unit 101 in the cell phone 100 according to the present embodiment, and in the figures, the processings identical to those in FIG. 6 are denoted with the same step numbers.

In FIG. 8, the processing in steps S1 to S8 is the same as those of the first embodiment. Then, in step S8, when the contact duration is the minimum contact time or more (step S8: YES), the control unit 101 sets a function group number i to 1 (step S21). Next, the control unit 101 displays the function guide i in the page display region (step S22). Then, when a next sampling timing comes, the control unit 101 obtains a coordinate signal from the coordinate detection unit 111 in the multi touch panel 109 (step S23). Next, the control unit 101 determines whether a contact has been detected at the contact start point based on the obtained coordinate signal (step S24). At this time, when a contact has been detected at the contact start point (step S24: YES), the control unit 101 determines whether the contact duration is the upper limit time of the i-th group of functions or more (step S25). At this time, when the contact duration is less than the upper limit time of the i-th group of functions (step S25: NO), the control unit 101 proceeds to step S23 to obtain a coordinate signal at the next sampling timing.

On the other hand, when the contact duration is the upper limit time of the i-th group of functions or more (step S25: YES), the control unit 101 adds 1 to the function group number i (step S26). Then, the control unit 101 determines whether the function group number i is more than 2 (step S27). At this time, when the function group number i is 2 or less (step S27: NO), the control unit 101 proceeds to step S22. At this time, the control unit 101 erases the function guide i−1 from the page display region and displays the function guide i in the page display region.

On the other hand, when the function group number i is more than 2 (step S27: YES), the control unit 101 proceeds to step S28. In this case, since the current contact duration is the upper limit time of the second group of functions or more and a corresponding group of functions is not present, the control unit 101 waits for the user to de-touch, and then proceeds to step S1. Specifically, the control unit 101 erases the function guide from the screen and returns to the original screen display (step S28). Next, when a next sampling timing comes, the control unit 101 obtains a coordinate signal from the coordinate detection unit 111 in the multi touch panel 109 (step S29). Then, the control unit 101 determines whether a contact point in the page display region on the screen has been detected based on the obtained coordinate signal (step S30). At this time, when a contact point has been detected (step S30: YES), the control unit 101 proceeds to step S29 to obtain a coordinate signal at the next sampling timing. On the other hand, when a contact point has not been detected (step S30: NO), the control unit 101 proceeds to step S1 to obtain a coordinate signal at a next sampling timing.

In step S24, when a contact has not been detected at the contact start point (step S24: NO), the control unit 101 proceeds to step S10 as shown in FIG. 9. The processing in steps S10 to S16 is the same as that of the first embodiment. Then, after calculating the moving direction of the contact point in step S16, the control unit 101 refers to the function table to select and execute the function assigned to the angle range including the calculated moving direction among the i-th group of functions (step S31).

As described above, according to the present embodiment, when the contact duration is the minimum contact time or more and the moving distance of the contact point is the function execution distance or more, the control unit 101 in the cell phone 100 executes a preset function in the angle range including the detected moving direction and in the time range including the contact duration. Therefore, since the user determines the contact duration at the contact point and the moving direction of the contact point thereby to select and execute a desired function from among the functions, it is possible to further enhance the convenience.

Incidentally, in each embodiment, four angle ranges of the moving directions of the contact point are assumed but three or less or five or more ranges may be assumed. The functions may be assigned to only predetermined ranges among the multiple angle ranges.

Further, in the second embodiment, two ranges of the contact duration are assumed, but three or more ranges may be assumed.

Furthermore, in the second embodiment, the functions are assigned to the ranges of the moving direction of the contact point and the ranges of the contact duration, but the functions may be assigned to only the ranges of the contact duration. In this case, the control unit 101 in the cell phone 100 executes the functions assigned to the ranges of the contact duration irrespective of the moving direction of the contact point. Also in this case, the control unit 101 may display the function guide. For the function guide in this case, the information indicating one function assigned to the range of the contact duration is displayed.

Furthermore, the control unit 101 may not display the function guide. In this case, the change in selectable functions may be clearly displayed in other method such as highlighted contact point.

Furthermore, the control unit 101 may not consider the moving direction of the contact point and the contact duration for determining the function to be executed. That is, when the contact duration is the minimum contact time or more and the moving distance of the contact point is the function execution distance or more, the control unit 101 may execute a preset function irrespective of the moving direction of the contact point and irrespective of how long the contact duration is.

Furthermore, in each embodiment, the present invention is applied to the case in which the preset function is executed in the shopping site while the Web page indicating the details of the products is being displayed, but the present invention may be applied to a case in which the function is executed while other Web page is being displayed. Further, the present invention may be also applied to a case in which the function is executed when a site other than the shopping site is being used.

Furthermore, in each embodiment, the function execution program of the present invention is applied to the application software for browsing a Web page, but the function execution program of the present invention may be applied to other application software. Further, the present invention may be applied to various functions of the cell phone 100.

Furthermore, in each embodiment, the terminal device according to the present invention is applied to the cell phone, but the terminal device according to the present invention may be applied to a device, if comprising a touch panel, other than the cell phone.

DESCRIPTION OF REFERENCE NUMERALS

100: Cell phone
101: Control unit
102: Wireless transmission/reception unit
103: Antenna
104: Call control unit
105: Speaker
106: Microphone
107: Incoming call report unit
108: Flash memory
109: Multi touch panel
110: Display
111: Coordinate detection unit
200: Shopping server
201: Control unit
202: Transmission/reception unit
203: Display
204: Keyboard
205: Storage unit
NW: Network
S: Shopping system

The invention claimed is:

1. A non-transitory computer-readable medium having recorded thereon a function execution program, the function execution program causing a computer to:
   detect a contact point on an input unit integral with a display unit and measure contact duration at the contact point before a movement of the contact point;
   when the contact duration is greater than or equal to a first predetermined time and less than a second predetermined time, display a first function guide corresponding a second time range including the contact duration among a plurality of time ranges into which a first time range whose lower limit is the first predetermined time is divided, the first function guide including first information indicating a correspondence between at least one first preset movement of the contact point and at least one first preset function to be executed;

when the contact duration is the second predetermined time or more, cease the display of the first function guide and display a second function guide corresponding a third time range including the contact duration among the plurality of time ranges, the second function guide including second information indicating a correspondence between at least one second preset movement of the contact point and at least one second preset function to be executed; detect a continuous movement of the contact point and measure a moving distance of the contact point;

when the first function guide is displayed and the moving distance is a predetermined distance or more, execute a first preset function of the at least one first preset function which is preset for the detected movement of the contact point; and when the second function guide is displayed and the moving distance is a predetermined distance or more, execute a second preset function of the at least one second preset function which is preset for the detected movement of the contact point, wherein each of the at least one second preset function corresponding to the third time range is different from each of the at least one first preset function corresponding to the second time range.

2. The non-transitory computer-readable medium according to claim 1, wherein the at least one preset movement of the contact point includes at least one direction range, and wherein the program further causing the computer to:

detect a moving direction in which the contact point continuously moves;

when the first function guide is displayed and the moving distance is the predetermined distance or more, execute a first preset function of the at least one first preset function which is preset for a direction range including the detected moving direction among the at least one direction range; and when the second function guide is displayed and the moving distance is the predetermined distance or more, execute a second preset function of the at least one second preset function which is preset for a direction range including the detected moving direction among the at least one direction range.

3. A terminal device, including at least one processor, comprising:

a time measure unit, within the at least one processor, configured to detect a contact point on an input unit integral with a display unit and measure contact duration at the contact point before a movement of the contact point;

a function guide unit, within the at least one processor, configured to:

when the contact duration is greater than or equal to a first predetermined time and less than a second predetermined time, display a first function guide corresponding a second time range including the contact duration among a plurality of time ranges into which a first time range whose lower limit is the first predetermined time is divided, the first function guide including first information indicating a correspondence between at least one first preset movement of the contact point and at least one first preset function to be executed;

when the contact duration is the second predetermined time or more, cease the display of the first function guide and display a second function guide corresponding a third time range including the contact duration among the plurality of time ranges, the second function guide including second information indicating a correspondence between at least one second preset movement of the contact point and at least one second preset function to be executed;

a distance measure unit, within the at least one processor, configured to detect a continuous movement of the contact point and measure a moving distance of the contact point; and an execution unit, within the at least one processor, configured to:

when the first function guide is displayed and the moving distance is a predetermined distance or more, execute a first preset function of the at least one first preset function which is preset for the detected movement of the contact point, and when the second function guide is displayed and the moving distance is a predetermined distance or more, execute a second preset function of the at least one second preset function which is preset for the detected movement of the contact point, wherein each of the at least one second preset function corresponding to the third time range is different from each of the at least one first preset function corresponding to the second time range.

4. The terminal device according to claim 3, further comprising:

a direction detection unit, within the at least one processor, configured to detect a moving direction in which the contact point continuously moves, wherein the at least one preset movement of the contact point includes at least one direction range, wherein when the first function guide is displayed and the moving distance is the predetermined distance or more, the execution unit is further configured to execute a first preset function of the at least one first preset function which is preset for a direction range including the detected moving direction among the at least one direction range, and wherein when the second function guide is displayed and the moving distance is the predetermined distance or more, the execution unit is further configured to execute a second preset function of the at least one second preset function which is preset for a direction range including the detected moving direction among the at least one direction range.

5. A function execution method, executed by at least one processor, the method comprising:

detecting, using the at least one processor, a contact point on an input unit integral with a display unit and measuring contact duration at the contact point before a movement of the contact point;

when the contact duration is greater than or equal to a first predetermined time and less than a second predetermined time, displaying, using the at least one processor, a first function guide corresponding a second time range including the contact duration among a plurality of time ranges into which a first time range whose lower limit is the first predetermined time is divided, the first function guide including first information indicating a correspondence between at least one first preset movement of the contact point and at least one first preset function to be executed;

when the contact duration is the second predetermined time or more, ceasing, using the at least one processor, the displaying of the first function guide and displaying, using the at least one processor, a second function guide corresponding a third time range including the contact duration among the plurality of time ranges, the second function guide including second information indicating a correspondence between at least one second preset movement of the contact point and at least one second preset function to be executed;

detecting, using the at least one processor, a continuous movement of the contact point and measuring the moving distance of the contact point;

when the first function guide is displayed and the moving distance is a predetermined distance or more, executing, using the at least one processor, a first preset function of the at least one first preset function which is preset for the detected movement of the contact point; and when the second function guide is displayed and the moving distance is a predetermined distance or more, executing, using the at least one processor, a second preset function of the at least one second preset function which is preset for the detected movement of the contact point, wherein each of the at least one second preset function corresponding to the third time range is different from each of the at least one first preset function corresponding to the second time range.

6. The function execution method according to claim 5, wherein the at least one preset movement of the contact point includes at least one direction range, and
wherein the method further comprises:
detecting, using the at least one processor, a moving direction in which the contact point continuously moves;
when the first function guide is displayed and the moving distance is the predetermined distance or more, executing, using the at least one processor, a first preset function of the at least one first preset function which is preset for a direction range including the detected moving direction among the at least one direction range; and
when the second function guide is displayed and the moving distance is the predetermined distance or more, executing, using the at least one processor, a second preset function of the at least one second preset function which is preset for a direction range including the detected moving direction among the at least one direction range.

7. An information processing system comprising a terminal device and a server device to which the terminal device can be connected via a network,
wherein the terminal device comprises:
at least one first processor;
a time measure unit, within the at least one first processor, configured to detect a contact point on an input unit integral with a display unit and measure contact duration at the contact point before a movement of the contact point;
a function guide unit, within the at least one processor, configured to:
when the contact duration is greater than or equal to a first predetermined time and less than a second predetermined time, display a first function guide corresponding a second time range including the contact duration among a plurality of time ranges into which a first time range whose lower limit is the first predetermined time is divided, the first function guide including first information indicating a correspondence between at least one first preset movement of the contact point and at least one first preset function to be executed, and
when the contact duration is the second predetermined time or more, cease the display of the first function guide and display a second function guide corresponding a third time range including the contact duration among the plurality of time ranges, the second function guide including second information indicating a correspondence between at least one second preset movement of the contact point and at least one second preset function to be executed;
a distance measure unit, within the at least one first processor, configured to detect a continuous movement of the contact point and measure a moving distance of the contact point; and
a transmission unit, within the at least one first processor, configured to:
when the first function guide is displayed and the moving distance is a predetermined distance or more, transmit, to the server device, an execution request for a first preset function of at least one first preset function which is preset for the detected movement of the contact point, and
when the second function guide is displayed and the moving distance is a predetermined distance or more, transmit, to the server device, an execution request for a second preset function of the at least one second preset function which is preset for the detected movement of the contact point,
wherein each of the at least one second preset function corresponding to the third time range is different from each of the at least one first preset function corresponding to the second time range, and
the server device comprises:
at least one second processor;
a receiving unit, within the at least one second processor, configured to receive the execution request transmitted from the terminal device; and
a processing unit, within the at least one second processor, configured to execute a processing corresponding to the received execution request.

8. The information processing system according to claim 7, wherein the terminal device further comprises a direction detection unit, within the at least one first processor, configured to detect a moving direction in which the contact point continuously moves,
wherein the at least one preset movement of the contact point includes at least one direction range,
wherein when the first function guide is displayed and the moving distance is the predetermined distance or more, the transmission unit is further configured to transmit, to the server device, an execution request for a first preset function of the at least one preset first function which is preset for a direction range including the detected moving direction among the at least one direction range, and
wherein when the second function guide is displayed and the moving distance is the predetermined distance or more, the transmission unit is further configured to transmit, to the server device, an execution request for a second preset function of the at least one second preset function which is preset for a direction range including the detected moving direction among the at least one direction range.

\* \* \* \* \*